United States Patent
Jiang et al.

(10) Patent No.: US 10,148,351 B2
(45) Date of Patent: Dec. 4, 2018

(54) OPTICAL CHANNEL MONITORING USING EXPANDED-SPECTRUM PILOT TONE

(71) Applicant: Huawei Technologies Co., Ltd., Shenzhen (CN)

(72) Inventors: Zhiping Jiang, Kanata (CA); Minggang Si, Shenzhen (CN); Dajiang Jin, Sichuan (CN); Xiaodong Luo, Chengdu (CN); Jianhong Ke, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/074,243

(22) Filed: Mar. 18, 2016

(65) Prior Publication Data

US 2017/0244479 A1    Aug. 24, 2017

Related U.S. Application Data

(63) Continuation of application No. PCT/CN2016/074144, filed on Feb. 19, 2016.

(51) Int. Cl.
*H04B 10/077* (2013.01)
*H04B 10/69* (2013.01)
(Continued)

(52) U.S. Cl.
CPC ....... *H04B 10/077* (2013.01); *H04B 10/0775* (2013.01); *H04B 10/516* (2013.01);
(Continued)

(58) Field of Classification Search
CPC ............... H04B 10/077; H04B 10/516; H04B 2210/075; H04B 10/50–10/588
See application file for complete search history.

(56) References Cited

U.S. PATENT DOCUMENTS 6,970,651 B1 * 11/2005 Schuster ............ H04B 10/1121
398/118
2002/0171894 A1 * 11/2002 Sun ...................... H04B 10/505
398/158
(Continued)

FOREIGN PATENT DOCUMENTS

CN    1267979 A    9/2000
WO    2015116501 A1    8/2015

OTHER PUBLICATIONS

Li, S., "Research on Pilot-Tone Based on High Speed DWDM System," Master Thesis, Jun. 30, 2013, pp. 1-75.
(Continued)

*Primary Examiner* — David Payne
*Assistant Examiner* — Casey Kretzer
(74) *Attorney, Agent, or Firm* — Slater Matsil, LLP

(57) ABSTRACT

A system monitors optical performance of an optical link within an optical network. The system includes an optical transmitter having an expanded-spectrum pilot-tone modulator for modulating an expanded-spectrum pilot tone onto a high-speed data signal to generate an expanded-spectrum optical signal and an optical receiver for receiving the expanded-spectrum optical signal and for detecting and decoding the expanded-spectrum pilot tone to enable monitoring of the optical performance of the optical link.

15 Claims, 16 Drawing Sheets

(51) Int. Cl.
*H04J 14/02* (2006.01)
*H04B 10/516* (2013.01)

(52) U.S. Cl.
CPC .............. *H04B 10/69* (2013.01); *H04J 14/02* (2013.01); *H04B 2210/075* (2013.01)

(56) References Cited

U.S. PATENT DOCUMENTS

| | | | | |
|---|---|---|---|---|
| 2003/0043437 | A1* | 3/2003 | Stough | H04B 10/07 398/141 |
| 2003/0180055 | A1* | 9/2003 | Azadet | H04B 10/503 398/183 |
| 2004/0066840 | A1* | 4/2004 | Moore, III | H04B 1/68 375/146 |
| 2005/0019040 | A1* | 1/2005 | Trutna, Jr. | H04B 10/5053 398/183 |
| 2005/0031342 | A1* | 2/2005 | Wu | H04B 10/505 398/32 |
| 2008/0166128 | A1* | 7/2008 | Toyomaki | H04J 14/02 398/79 |
| 2009/0087187 | A1* | 4/2009 | Rohde | H04B 10/25752 398/115 |
| 2009/0208214 | A1* | 8/2009 | Hauenschild | H04B 10/50 398/78 |
| 2009/0324219 | A1* | 12/2009 | Jiang | H04J 14/0221 398/34 |
| 2012/0288274 | A1* | 11/2012 | Li | H04B 10/0775 398/16 |
| 2013/0266320 | A1* | 10/2013 | Kai | H04J 14/00 398/79 |
| 2014/0023368 | A1* | 1/2014 | Bhandare | H04J 14/06 398/65 |
| 2014/0105596 | A1* | 4/2014 | Oda | H04B 10/564 398/34 |

OTHER PUBLICATIONS

Li, B., "Estimation and Compensation of Sampling Clock Frequency Offset in Coherent OFDM Systems With a Pilot-Aided Method," Jan. 31, 2015, pp. 1-5, vol. 44, No. 1.

Min, P. et al., "Study of PDM-CO-OFDM System Pilot Structure Optical Communication Technology," Dec. 31, 2015, pp. 1-3, No. 12.

* cited by examiner

OPTICAL CHANNEL MONITORING USING EXPANDED-SPECTRUM PILOT TONE

This application is a continuation of PCT Application Serial Number PCT/CN2016/074144, entitled "Optical Channel Monitoring Using Expanded-Spectrum Pilot Tone," filed on Feb. 19, 2016, which application is hereby incorporated herein by reference.

TECHNICAL FIELD

The present disclosure relates generally to optical telecommunications and, more particularly, to optical performance monitoring using a pilot tone.

BACKGROUND

In dense wavelength division multiplex (DWDM) systems, a pilot tone is used to conduct optical performance monitoring. The pilot tone is a small and low-frequency modulation (e.g. kHz to MHz) applied to a high-speed optical channel, thus providing an in-band ancillary channel for performance monitoring. The pilot tone may be used to carry wavelength and other link-characterizing information. As depicted in FIG. 1, an optical network may have a plurality of nodes, each node including a reconfigurable optical add-drop multiplexer (ROADM). The network may also include a plurality of pilot tone detectors at various locations in the optical network to monitor channel information, such as wavelength, power, modulation format, baud rate, and/or other performance characteristics. Each pilot tone detector (PTD) typically includes a low-speed photodiode and a digital signal processor (DSP).

However, there exist strong discrete tones ("interference tones") in the high-speed data channel due to factors such as forward error correction (FEC) and digital signal processor (DSP) frame structure, especially when the payload contains an Alarm Indication Signal (AIS), an Open Connection Indication (OCI), or a locked status (LCK). These interference tones may coincide with the pilot tone frequency, making pilot tone detection very challenging.

FIGS. 2 and 3 are graphs plotting the spectra of an AIS payload and a pseudo random bit sequence (PRBS) payload, respectively. Discrete tones depend on the payload, transmitter baud rate, etc. In practice, it may be difficult, particularly for signals carrying the AIS, OCI, LCK payloads, to avoid these tones by selecting non-interfering pilot tone (PT) frequencies because there are so many different baud rates (including clock drift), FEC codes, DSP frame structures, etc.

An improved optical channel monitoring technique would be highly desirable to provide a low-cost, efficient solution for monitoring the performance of optical networks.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses a technique for optical performance monitoring that uses an interference-tolerant expanded-spectrum pilot tone.

One aspect of the disclosure is a system that monitors an optical channel within an optical network. The system includes an optical transmitter having an expanded-spectrum pilot-tone modulator for modulating an expanded-spectrum pilot tone onto a high-speed data signal to generate an expanded-spectrum optical signal and an optical receiver for receiving the expanded-spectrum optical signal and for detecting the pilot tone to monitor the optical channel.

Another aspect of the disclosure is a method of monitoring an optical channel within an optical network. The method entails modulating an expanded-spectrum pilot tone onto a high-speed data signal to generate an expanded-spectrum signal, transmitting the expanded-spectrum signal over the optical link, receiving the expanded-spectrum signal, and detecting the pilot tone in the expanded-spectrum signal to monitor the optical channel.

Yet another aspect of the disclosure is an optical transmitter having an input for receiving a data signal, a pilot-tone modulator for modulating an expanded-spectrum pilot tone onto the data signal to thereby generate a digital expanded-spectrum data signal, a digital-to-analog converter for converting the digital expanded-spectrum data signal to an analog expanded-spectrum data signal, and an electrical-to-optical converter for converting the analog expanded-spectrum data signal to an optical expanded-spectrum data signal for transmission.

Yet a further aspect of the disclosure is an optical receiver having an input for receiving an optical expanded-spectrum data signal, a photodiode, an analog-to-digital converter and a detector having a correlation module for performing correlations to detect a pilot tone in the data signal. The correlations may be performed using a pre-defined spectrum-expanding coding function, e.g. a coding function applied by the optical transmitter to modulate the expanded-spectrum pilot tone onto the data signal.

BRIEF DESCRIPTION OF THE DRAWINGS

These and other features of the disclosure will become more apparent from the description in which reference is made to the following appended drawings.

DETAILED DESCRIPTION OF ILLUSTRATIVE EMBODIMENTS

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and system that use an expanded-spectrum pilot tone to perform optical performance monitoring. An expanded-spectrum pilot tone is transmitted using a bandwidth that is in excess of the bandwidth of a continuous-wave pilot tone. This expanding (or "distributing") of the pilot tone over a large bandwidth can make the resulting expanded-spectrum pilot tone more resistant to interference. Consequently, the expanded-spectrum pilot tone may be easier to detect by a pilot tone detector in an optical network.

Figure 1:
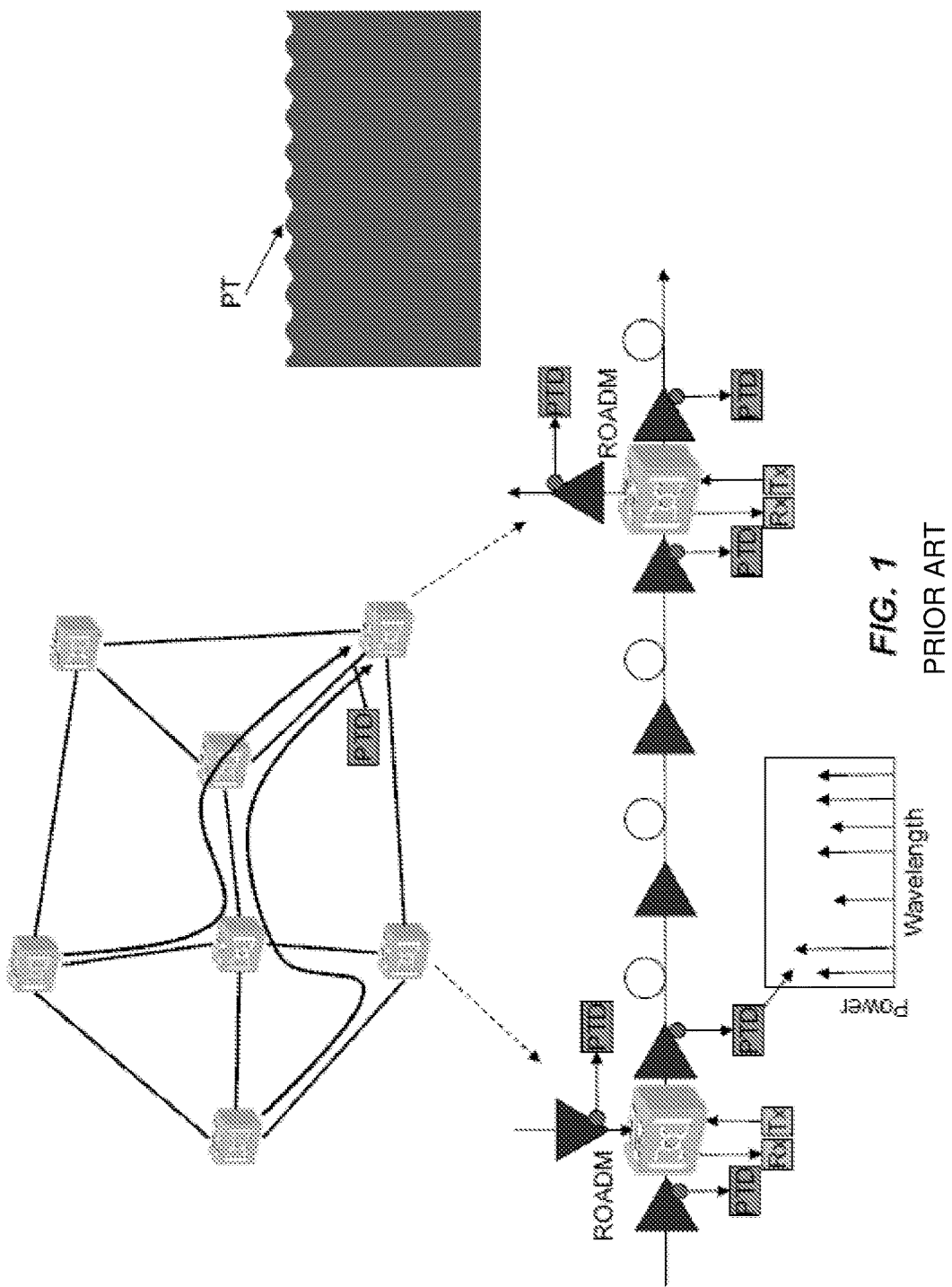
FIG. 1 depicts an optical network having multiple pilot-tone detectors for monitoring optical performance of an optical link of the optical network.
Figure 2:
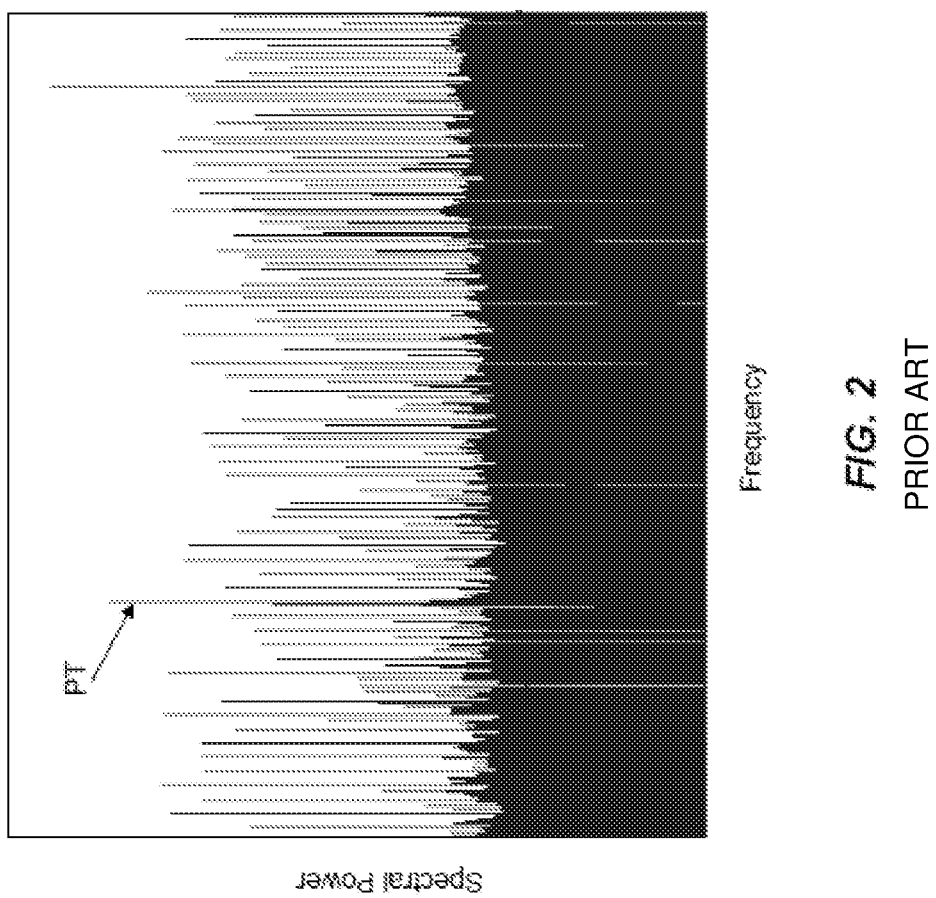
FIG. 2 is a spectral plot showing a continuous wave pilot tone amid an alarm indication signal (AIS) payload.
Figure 3:
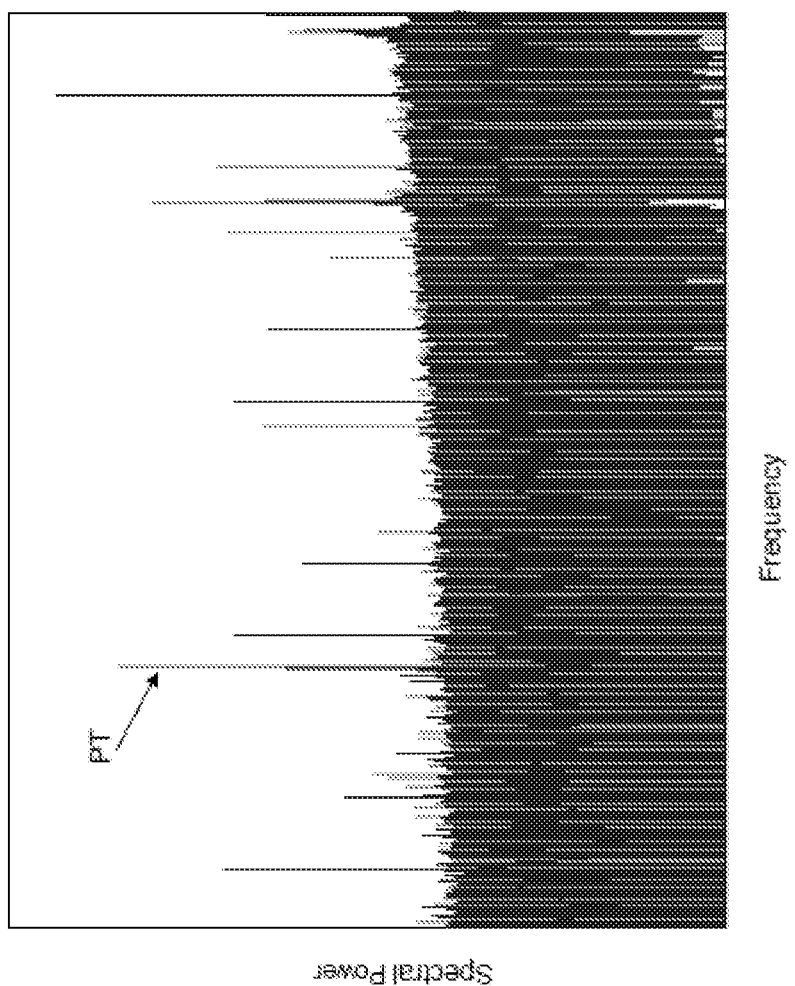
FIG. 3 is a spectral plot showing a continuous wave pilot tone amid a pseudo random bit sequence (PRBS) payload.
Figure 4:
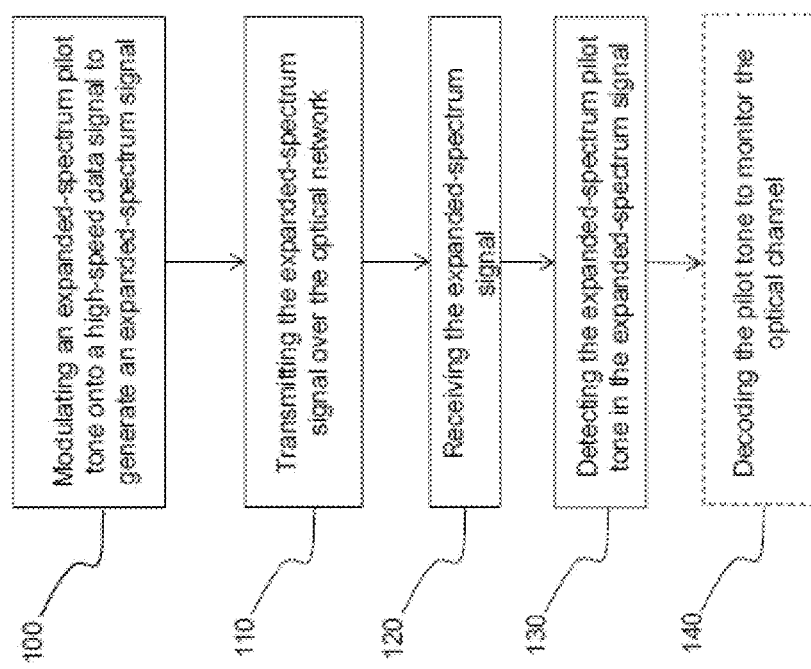
FIG. 4 is a flowchart presenting a method of monitoring optical performance.

FIG. 4 depicts a flowchart delineating in broad terms a method of optical performance monitoring. The method generally involves the application of an expanded-spectrum coding function to a continuous-wave pilot tone in order to distribute the pilot tone over an expanded frequency band that is less susceptible to interference. The pilot tone is subsequently detected (and optionally also decoded) by a pilot tone detector. As shown in FIG. 4, the method entails modulating 100 an expanded-spectrum pilot tone onto a high-speed data signal to generate an expanded-spectrum signal, transmitting 110 the expanded-spectrum signal over the optical network, receiving 120 the expanded-spectrum signal, detecting 130 the expanded-spectrum pilot tone in the expanded-spectrum signal. The method may optionally include a further step of decoding 140 the pilot tone to monitor optical channel. It is to be emphasized that more than one expanded-spectrum signal may be received simultaneously 120. The wavelengths (each carrying its own pilot-tone) may come from the same node or from different nodes in the optical network.

Figure 5:
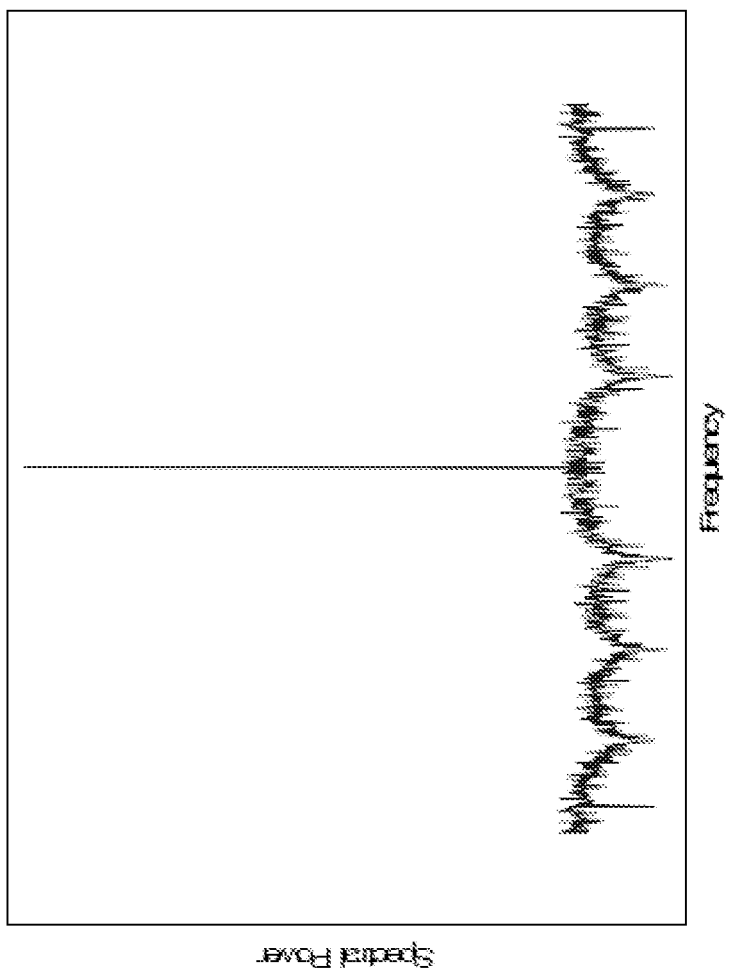
FIG. 5 is an example of a spectral plot of a continuous wave pilot tone.

For a conventional continuous-wave pilot tone having a given circular frequency $\omega_{PT}$, modulation depth m, and in-band binary data i.e. pilot tone data d(t), the high-speed optical data signal's electrical field $E_0(t)$ is modulated with the pilot tone as follows to provide the modulated signal's electrical field $E_{PT}(t)$ which is given by the relation: $E_{PT}(t)=E_0(t)(1+d(t)m\sin(\omega_{PT}t))$. FIG. 5 shows one specific example of a spectral plot of a continuous wave pilot tone.

Figure 6:
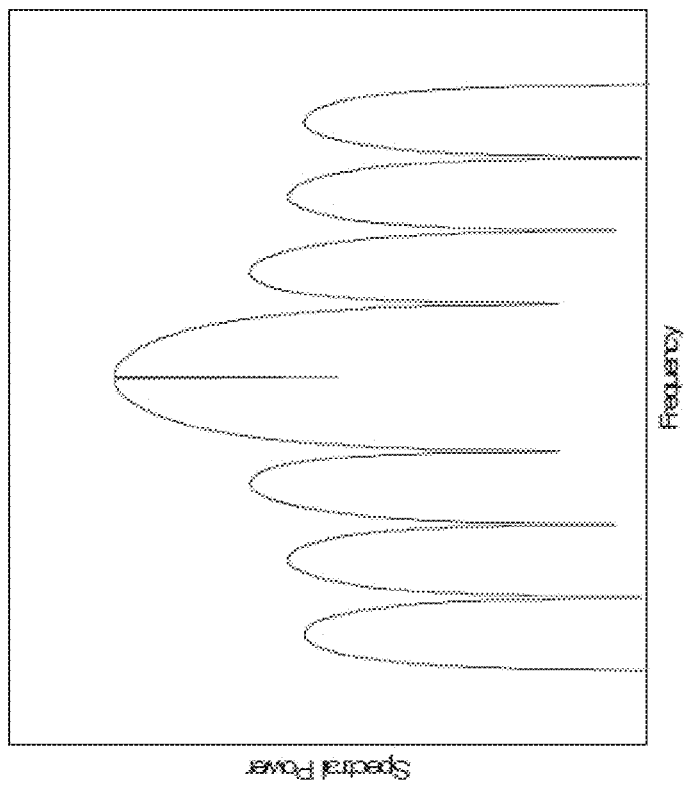
FIG. 6 is an example of a spectral plot of an expanded-spectrum pilot tone.
Figure 7:
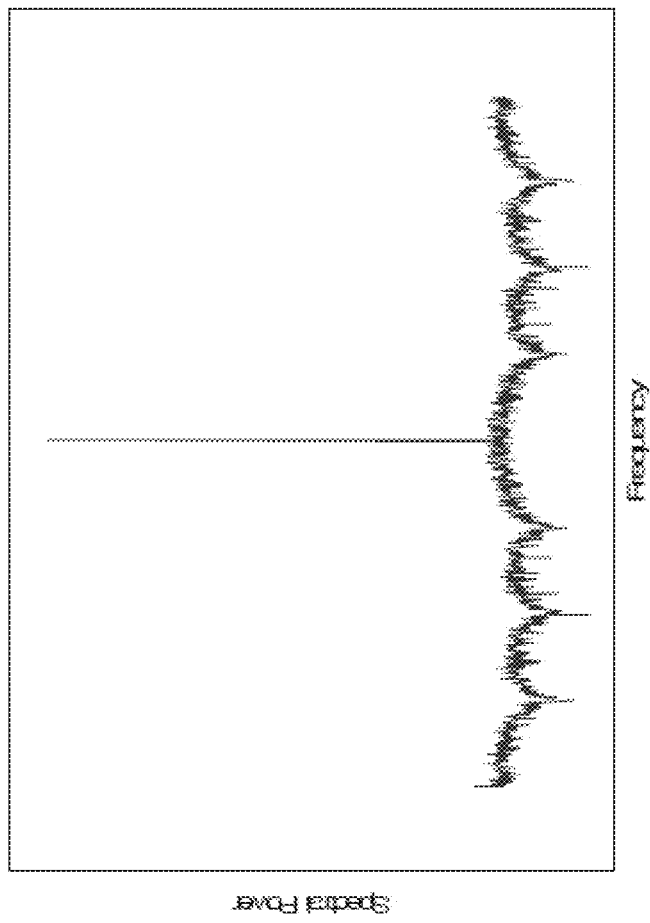
FIG. 7 is an example of a spectral plot of the recovered pilot tone.

For an expanded-spectrum pilot tone, the signal is modulated by applying a spectrum-expanding code $f_{ESC}(t)$. In other words, modulation is accomplished by applying the spectrum-expanding code $f_{ESC}(t)$ to the pilot-tone as follows: $E_{PT}(t)=E_0(t)(1+d(t)\ f_{ESC}(t)m\sin(\omega_{PT}t))$. In one embodiment, $f_{ESC}(t)$ is, or includes, a pseudo random bit sequence (PRBS) although it will be appreciated that other equivalent or suitable codes may be utilized. It is also to be noted that the bandwidth of $f_{ESC}(t)$ is typically much larger than d(t) but much smaller than $E_0(t)$. FIG. 6 shows one specific example of a spectral plot of the expanded-spectrum pilot tone. FIG. 7 shows one specific example of a spectral plot of the recovered pilot tone. The modulated signal having time-varying electrical field $E_{PT}(t)$ is then transmitted through one or more optical links of an optical network to one or more nodes of the network. At various locations in the network, a pilot tone detector (PTD) may be placed to measure and monitor optical performance. The pilot tone detector in one embodiment implements a square-law detection technique to detect the pilot tone. Since the pilot tone is a lower frequency signal than the high-speed data signal, the pilot tone detector may detect the pilot tone using a low-speed photodiode. The time-varying current I(t) is given by the relation $I(t)=|E_0(t)|^2(1+2d(t)\ f_{ESC}(t)m\sin(\omega_{PT}t)+|d(t)\ f_{ESC}(t)m\sin(\omega_{PT}t)|^2)$. Since $E_0(t)$ is too fast for the low-speed photodiode, the current may be represented by $I(t)\approx I_0(1+2d(t)f_{ESC}(t)m\sin(\omega_{PT}t))$. Since only the term containing the modulation is kept, the relation can be expressed as $I(t)\approx I_0 It)2d(t)\ f_{ESC}(t)m\sin(\omega_{PT}t)$.

Decoding is accomplished by performing a correlation operation, using a correlator or correlation module, that employs the same spectrum-expanding code $f_{ESC}(t)$ as follows: $I_0 2d(t)\ f_{ESC}(t)m\sin(\omega_{PT}t)*f_{ESC}(t)$, where * is the correlation operator. However, since the peak of $f_{ESC}(t)*f_{ESC}(t)$ is strong and known, the correlation peak is proportional to $I_0(t)2d(t)\ f_{ESC}m\sin(\omega_{PT}t)$. If there is no signal, the correlation peak is much smaller. For example, consider two sequences $m_1$ and $m_2$ derived from $2^7-1$ PRBS as follows:

$m_1$: −1 −1 −1 −1 −1 −1 1 1 1 1 1 1 1 −1 1 −1 1 −1 1 −1
−1 1 1 −1 −1 1 1 1 −1 1 1 1 −1 −1 −1 1 −1 1 1 −1 −1 −1
1 1 −1 1 1 1 1 −1 1 1 1 −1 1 −1 1 1 −1 1 1 −1 −1 −1 1 1
−1 −1 −1 1 1 1 −1 −1 −1 −1 1 −1 1 1 1 1 1 1 −1 −1 1 −1 1
−1 1 1 1 −1 −1 1 1 −1 1 −1 −1 −1 1 −1 −1 1 1 1 1 −1 −1
−1 1 −1 1 1 −1 −1 −1 −1 1 1 −1 −1 −1 −1 −1 1 1

$m_2$: −1 −1 −1 −1 −1 −1 1 −1 −1 −1 −1 1 1 −1 1 −1 −1 −1
1 1 1 1 −1 1 1 1 −1 −1 −1 −1 1 1 1 1 1 1 1 −1 −1 −1 1 1
1 −1 1 1 −1 −1 1 1 −1 1 −1 −1 1 −1 1 1 1 1 1 −1 1 −1 1 1
−1 1 −1 −1 −1 −1 −1 1 −1 1 1 1 −1 1 1 1 1 −1 −1 1 1 −1 1
−1 1 −1 1 1 −1 −1 1 1 −1 −1 −1 −1 −1 −1 1 1 −1 1 1 1 −1 1
−1 1 1 1 −1 1 −1 −1 −1 −1 1 1 −1 −1 1 −1 −1 −1 −1 1

Figure 8:
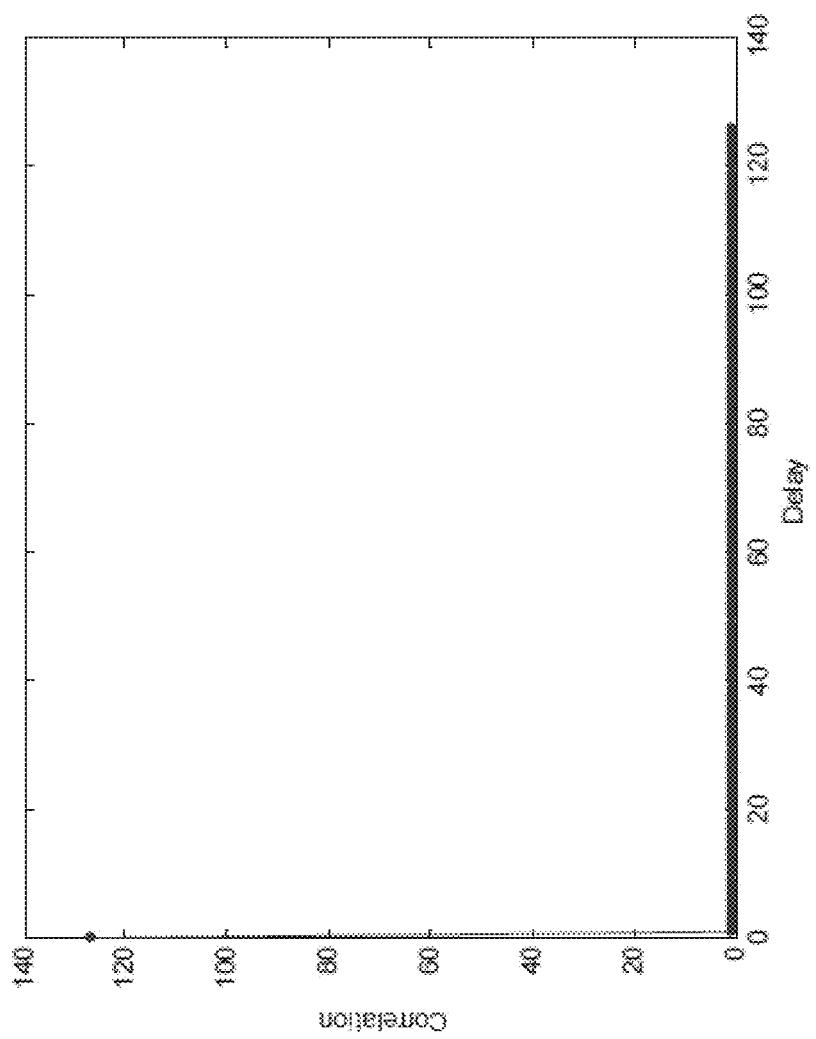
FIG. 8 is a plot showing a correlation $m_1*m_1$ where $m_1$ represents a $2^7-1$ pseudo random bit sequence.
Figure 9:
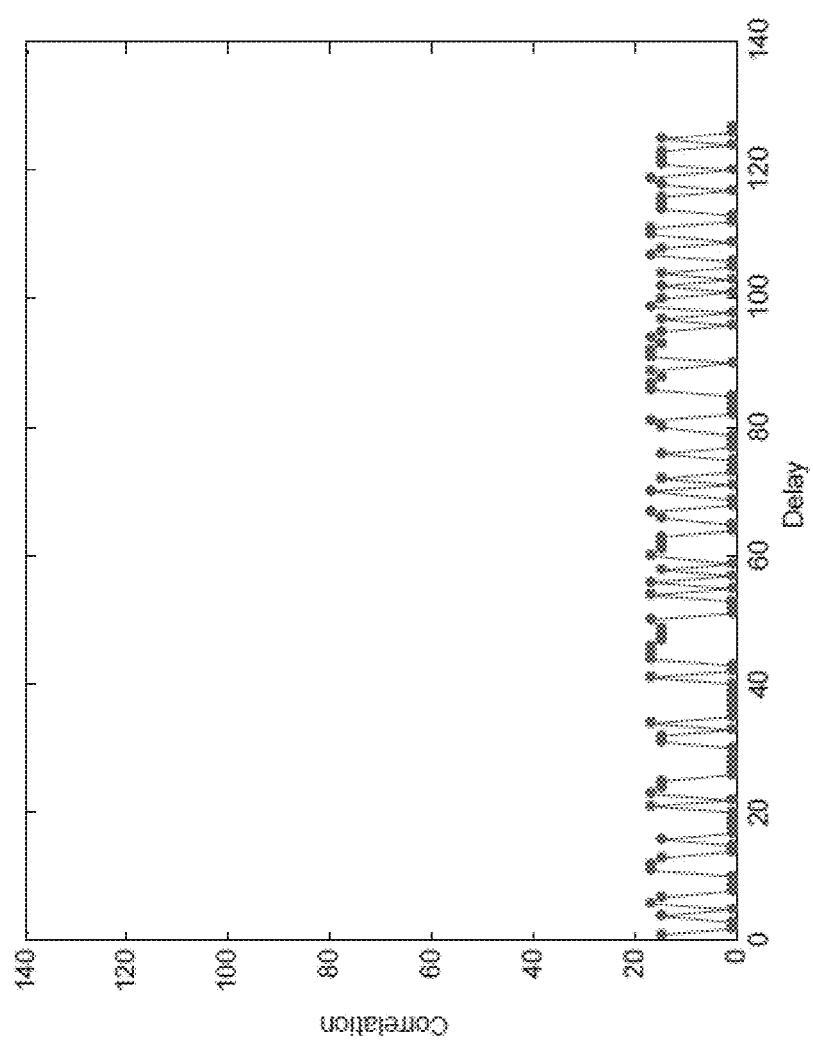
FIG. 9 is a plot showing the correlation $m_1*m_2$ where $m_1$ and $m_2$ represent two $2^7-1$ pseudo random bit sequences.

FIG. 8 is a plot showing the correlation $m_1*m_1$. It is noted that there is a strong peak at delay 0 having a peak amplitude of 127. FIG. 9 is a plot showing the correlation $m_1*m_2$, for which there is no strong peak.

Figure 10:
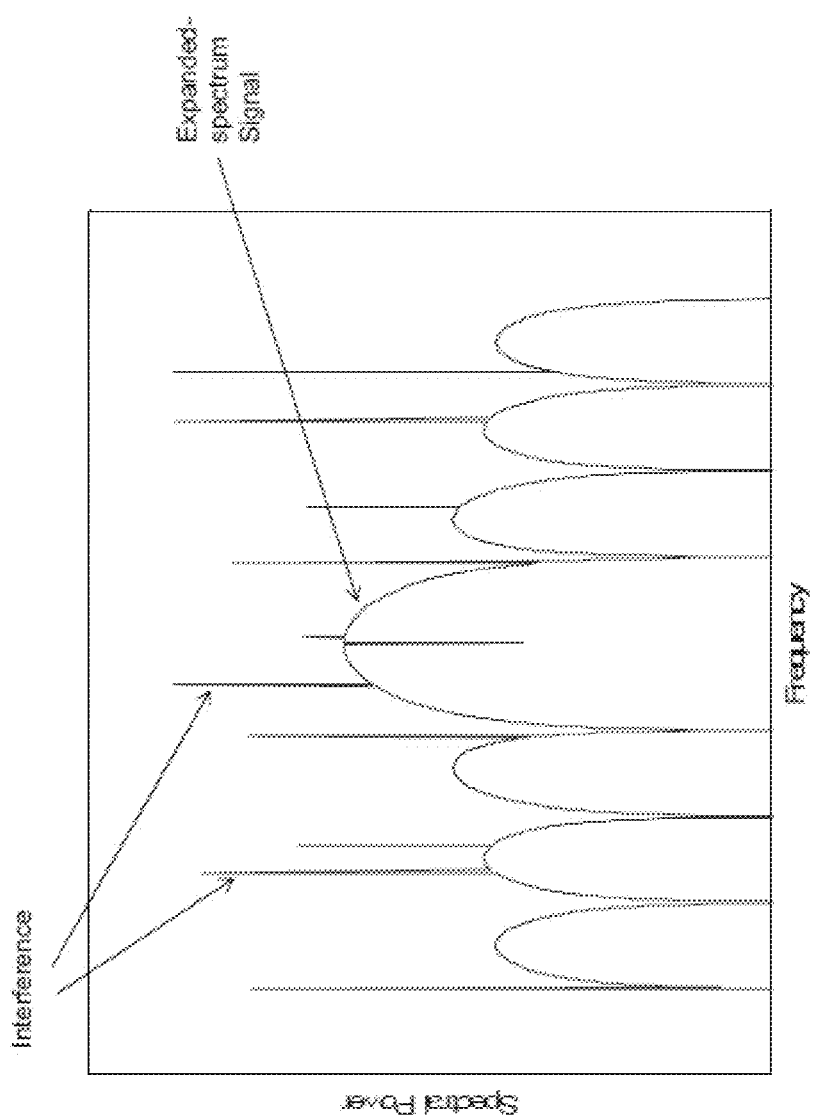
FIG. 10 is a spectral plot showing an expanded-spectrum pilot tone with significant interference tones.
Figure 11:
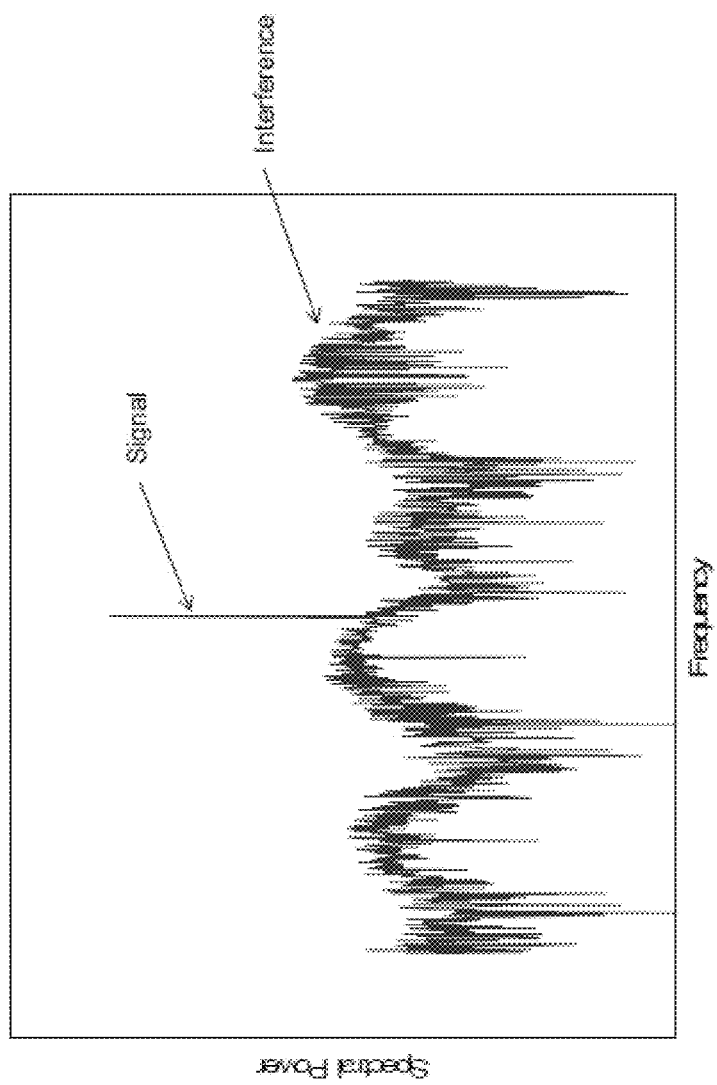
FIG. 11 is a spectral plot showing the pilot tone after it has been recovered while the spectra of interference tones have been distributed into the noise floor.

By using this spectrum-expanding method, the pilot tone can be detected under conditions of significant interference that would otherwise render detection highly problematic using prior-art techniques. The spectrum-expanding method disclosed herein makes the pilot tone more easily recoverable, thereby facilitating optical performance monitoring in an optical network. For example, FIG. 10 depicts a spectral plot showing an expanded-spectrum pilot tone with significant interference tones. After decoding, the pilot tone is recovered while the spectra of interference tones are distributed into the noise floor as shown by way of example in FIG. 11.

Figure 12:
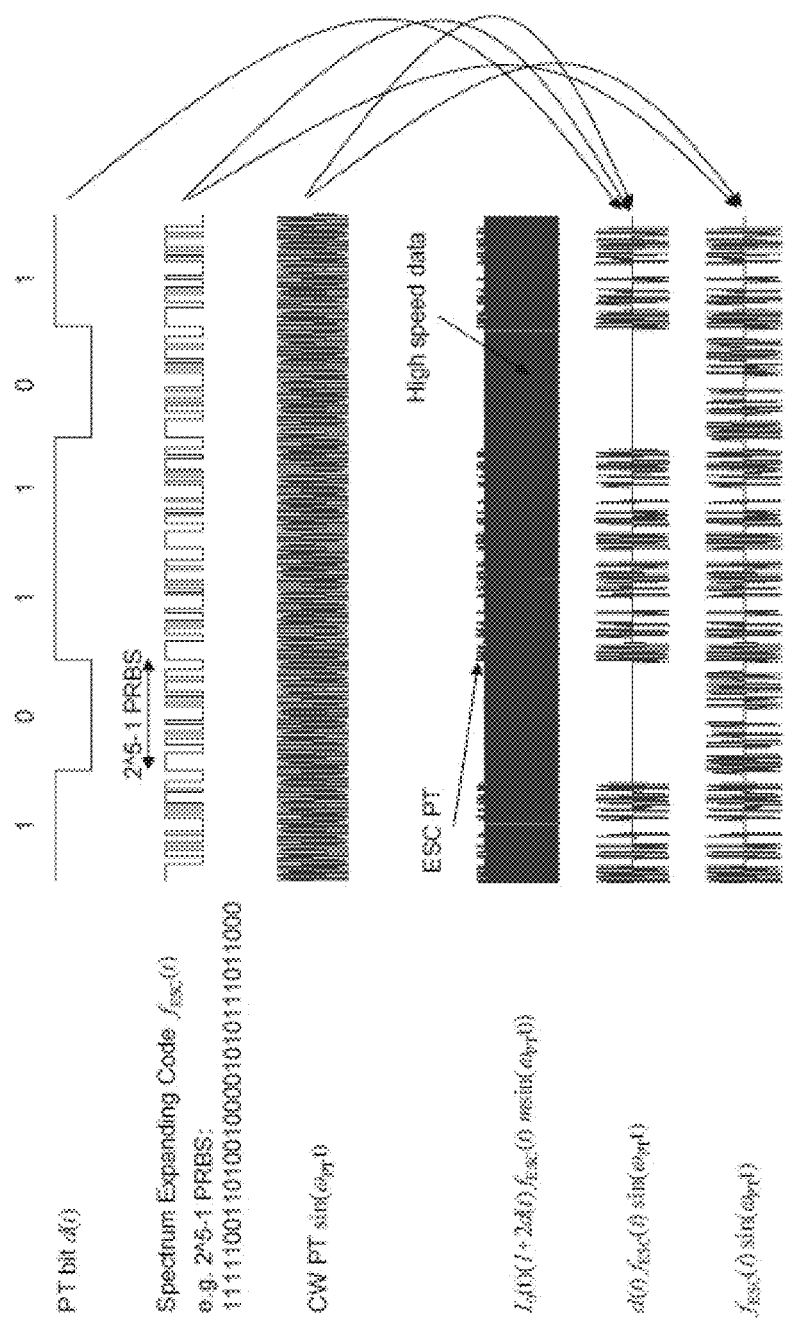
FIG. 12 presents six vertically aligned graphical representations of various forms of signals in a spectrum-expanding pilot-tone modulation technique.

FIG. 12 illustrates a specific example of a spectrum-expanding pilot-tone modulation technique that may be used for optical performance monitoring. FIG. 12 presents six vertically aligned graphical representations of various forms of signals. At the top is a pilot-tone (PT) bit sequence represented by the function d(t). In this example, d(t) is 101101. The pilot-tone bit sequence d(t) may be, for example, data identifying or characterizing the channel. The function d(t) is modulated by applying a spectrum-expanding code $f_{ESC}(t)$ which is, in this example, a pseudo random bit sequence (PRBS), e.g. 1111100110100100001010111011000. The length of the PRBS in this example is $2^5-1$. The length of the PRBS may be varied in other embodiments. FIG. 12 also shows in the third representation from the top a continuous wave (CW) pilot tone (PT) having the form $\sin(\omega_{PT}t)$. The CW PT may have a modulation depth m in which case the CW PT may be represented as $m \sin(\omega_{PT}t)$. As shown by the arrows in FIG. 12, the PT bit sequence d(t), the spectrum-expanding code $f_{ESC}(t)$ and the CW PT are mixed together to provide the fifth signal from the top shown in FIG. 10, which is mathematically described as the product of these three signals, namely $d(t)f_{ESC}(t)\sin(\omega_{PT}t)$. The sixth signal representation, i.e. the representation at the bottom of FIG. 12, namely $f_{ESC}(t)\sin(\omega_{PT}t)$, is produced by mixing only the spectrum-expanding code $f_{ESC}(t)$ and the CW PT, i.e. omitting the PT bit sequence d(t). The fourth signal representation from the top shows the high-speed data and the expanded-spectrum pilot tone that is superimposed on the high-speed data.

Figure 13:
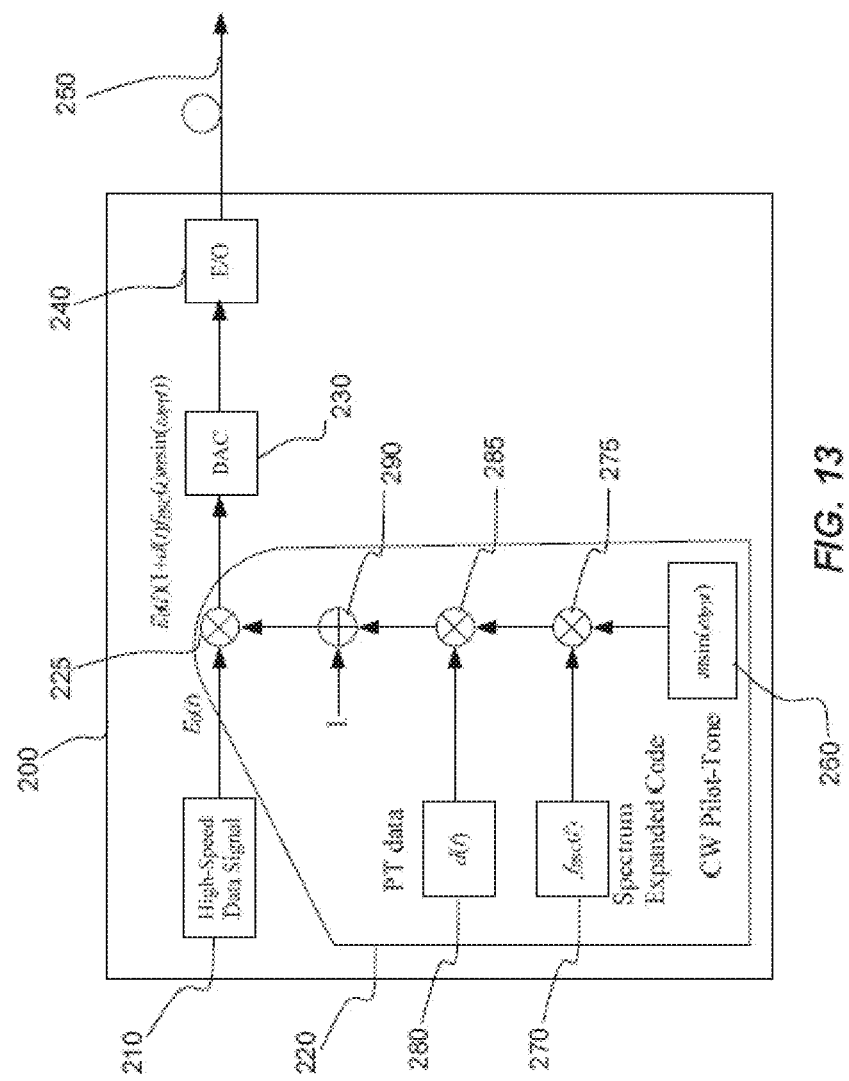
FIG. 13 depicts an optical transmitter having a spectrum-expanding pilot-tone modulator.

In the embodiment depicted by way of example in FIG. 13, an optical transmitter 200 includes a high-speed data signal input 210 carrying high-speed data signal $E_0(t)$, a spectrum-expanding pilot-tone modulator 220, a digital-to-analog (DAC) converter 230 and an electrical-to-optical (E/O) converter 240. The optical transmitter transmits the modulated optical signal over an optical link 250. For quadrature-based modulation schemes, there would be four such units. In FIG. 13, the variable m represents the modulation depth, $\omega_{PT}(t)$ represents a pilot-tone circular frequency, and $f_{ESC}(t)$ represents the expanded-spectrum coding function. The coding function could be, in one embodiment, a pseudo random bit sequence (PRBS) having values of 1,0 or 1,-1. The function d(t) represents the pilot-tone data, which is binary data (1,0) in this embodiment. In the embodiment illustrated in FIG. 13, the modulator 220 includes a continuous wave (CW) pilot tone generator 260, a spectrum-expanding code function generator 270 and a first mixer 275 for mixing the CW pilot tone with the coding function to generate a spectrum-expanded modulated pilot tone. The modulator 220 also includes a PT data generator 280 and a second mixer 285 for mixing the PT data d(t) with the spectrum-expanded modulated pilot tone. The modulator 220 also includes an addition module 290 to add a constant value of 1 to the function. The modulator 220 also includes a third mixer 225 to modulate the pilot tone onto the high-speed data signal. Note that in the transmitter 200, there may be more than one high speed data/DAC path, e.g. in a typical coherent transmitter, there are 4 paths, in which case the spectrum-expanded pilot tone may be applied to all 4 paths.

Figure 14:
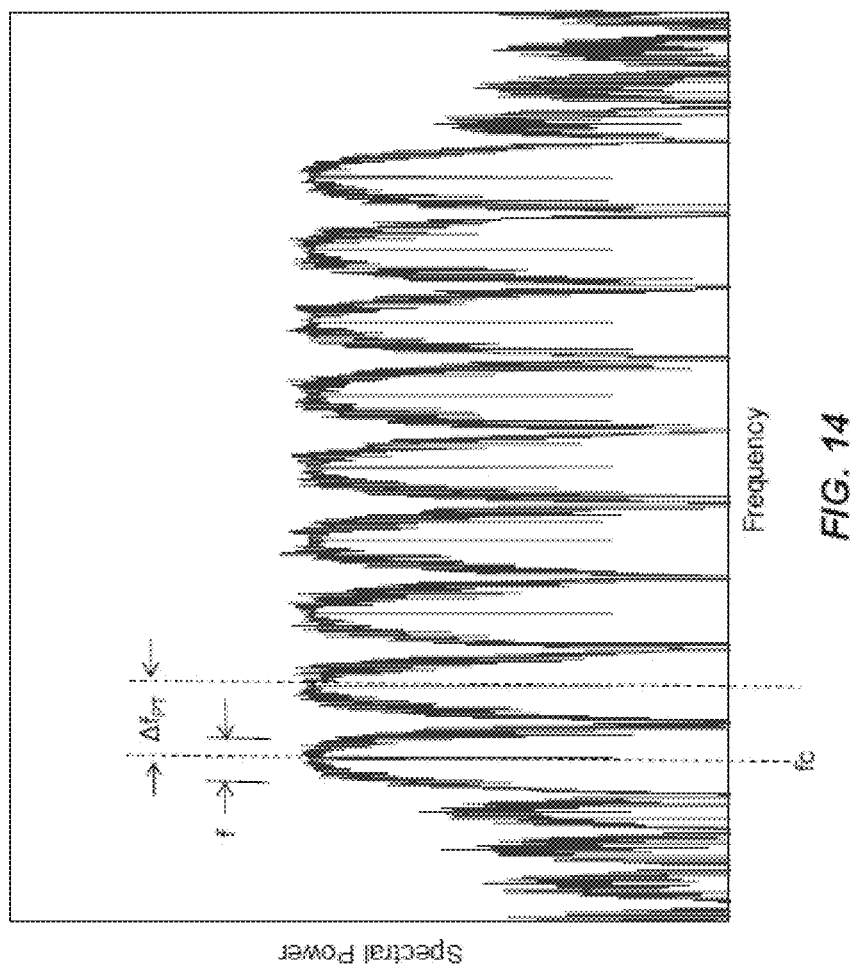
FIG. 14 is a spectral plot showing nine adjacent pilot tones for nine channels.
Figure 15:
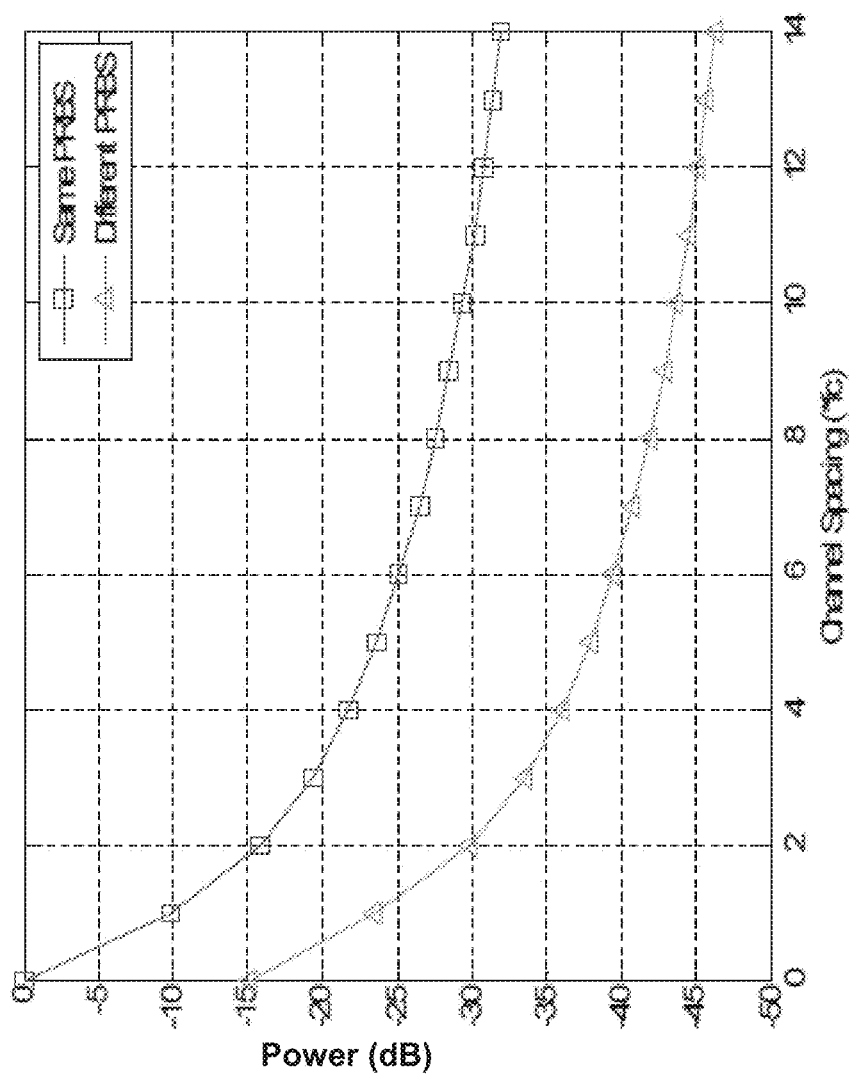
FIG. 15 presents a graph showing crosstalk as a function of channel spacing for a first implementation in which the pseudo random bit sequences (PRBSs) are all the same and for a second implementation in which the pseudo random bit sequences (PRBSs) are all different.

As shown by way of example in FIG. 14, in an implementation having multiple channels, the expanded spectra of these channels may partially overlap each other, which may introduce crosstalk. For example, in the example shown in FIG. 14, there are nine adjacent pilot tones with one pilot tone per channel. Although nine pilot tones are shown in FIG. 14, it will be appreciated that the number of pilot tones may be varied. It is to be noted that the channels in FIG. 14 are not optical channels but rather spectra of the modulated pilot tones. To reduce neighboring channel interference, i.e. to mitigate crosstalk, different codes (e.g. different PRBS codes) may be used for neighboring channels. By using, for example, a channel spacing equal to twice the expanded spectrum code rate $2f_c$, and by using different PRBS codes, the crosstalk can be suppressed by, for example, approximately 14 dB as shown in FIG. 15. It will be appreciated furthermore that the different expanded-spectrum codes used for the respective channels may be asynchronous. Moreover, it will be appreciated that a narrowly expanded spectrum is desirable because a narrowly expanded spectrum has been found to reduce channel crosstalk. In FIG. 14, the nine pilot tones on the nine channels may have a channel spacing of, for example, $\Delta f_{PT}$=100 kHz and a channel bandwidth of, for example, f=50 kHz. This is an example of a narrowly expanded spectrum because $f<\Delta f_{PT}$.

Figure 16:
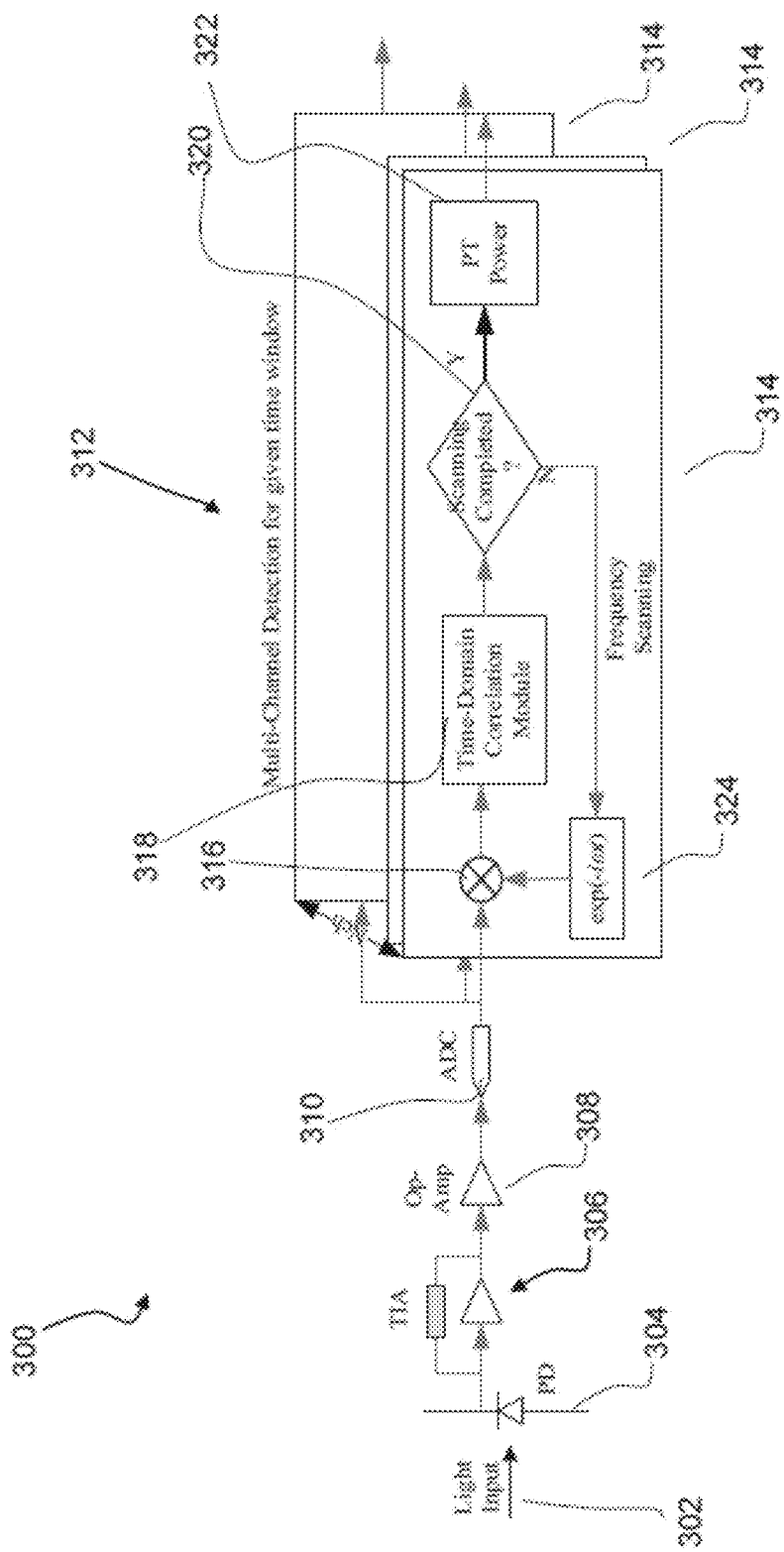
FIG. 16 depicts an optical receiver for detecting and decoding the pilot tone.

In the embodiment illustrated by way of example in FIG. 16, an optical receiver 300 receives, detects and decodes the pilot tone to recover the PT bit sequence d(t). The optical receiver 300 includes a light input (optical link) 302, a photodiode (PD) 304, a transimpedance amplifier (TIA) 306, an operational amplifier ("op-amp") 308, i.e. an AC-coupled high-gain electronic voltage amplifier, an analog-to-digital converter (ADC) 310 for digitizing the analog electrical signal, and a multi-channel detection unit 312 comprising a plurality of detectors 314 for the multiple channels. There is one detector 314 for each channel in this embodiment. In the embodiment of FIG. 16, each detector 314 includes a mixer 316 for mixing the signal from the ADC 310 with a down-shifting factor 324 to shift the signal frequency down to around DC. Each detector 314 also includes a time-domain correlator (or "time-domain correlation module") 318 and a decision block 320 which determines if the frequency scanning has been completed. If the scanning has been completed, then the next step is to extract the PT power. Otherwise, the method continues scanning the frequency by incrementing or decrementing the circular frequency w of the down-shifting factor 324. The optical receiver 300 includes a PT power processing module 322 for extracting the optical power from the maximum correlation peak value after the frequency scanning is done.

To detect a particular expanded-spectrum pilot tone, both the pilot tone frequency and the expanded spectrum code phase have to be matched. This can be accomplished by performing the following steps: in a first step, data is gathered for one complete ESC duration $T_{ESC}$. In a second step, for $\omega \sim \omega_{PT}$, the frequency is shifted down to around DC by $\omega$. In a third step, a time domain correlation is performed using the same ESC. The correlation peak is recorded. Subsequently, the second and third steps are repeated with a different frequency w to find the maximum peak. It is to be noted that a frequency scanning range is determined by a maximum clock difference between the pilot-tone generator 220 and the detector 314 and by the pilot-tone frequency. The frequency scanning step size is determined by $T_{ESC}$ such that the step size should be much smaller than $1/T_{ESC}$ to satisfy the accuracy requirement.

From the above, it will be appreciated that the expanded-spectrum pilot tone makes optical performance monitoring in DWDM systems much more tolerant to strong discrete interferences compared to continuous wave pilot tones. In the embodiments disclosed herein, each wavelength channel has a unique pilot-tone.

In one implementation, the pilot tones have frequencies $\omega_{PT}$ in the range of approximately 1-100 MHz whereas the spectrum-expanding coding function $f_{ESC}(t)$ has a frequency in the range of 1-100 kHz. In a more specific implementation, the pilot tones have frequencies $\omega_{PT}$ in the range of approximately 10-99 MHz whereas the spectrum-expanding coding function $f_{ESC}(t)$ has a frequency in the range of 10-99 kHz. In a still more specific implementation, the pilot tones have frequencies $\omega_{PT}$ in the range of approximately 30-60 MHz whereas the spectrum-expanding coding function $f_{ESC}(t)$ has a frequency in the range of 30-60 kHz.

In another implementation, the expanded-spectrum pilot tone technique described herein may be coupled with frequency division multiplexing to further reduce crosstalk between adjacent PT channels. For example, a first pilot tone of a first channel may be at 30 MHz with a second pilot tone of a second channel being at 30 MHz+100 kHz, the third pilot tone at 30 MHz+200 kHz, the fourth pilot tone at 30 MHz+300 kHz, and so on.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

What is claimed is:

1. An optical transmitter comprising:
an input for receiving a data signal;
a pilot-tone modulator for modulating an expanded-spectrum pilot tone onto the data signal to thereby generate a digital expanded-spectrum data signal;
a digital-to-analog converter for converting the digital expanded-spectrum data signal to an analog expanded-spectrum data signal; and
an electrical-to-optical converter for converting the analog expanded-spectrum data signal to an optical expanded-spectrum data signal for transmission over and monitoring of an optical channel in an optical network, the expanded-spectrum pilot tone expanded by a different code than neighboring expanded-spectrum pilot tones in neighboring expanded-spectrum data signals transmitted over neighboring optical channels in the optical network.

2. The optical transmitter of claim 1 wherein the pilot-tone modulator comprises a first mixer for mixing a continuous wave pilot tone with a spectrum-expanding coding function $f_{ESC}(t)$.

3. The optical transmitter of claim 2 wherein the spectrum-expanding coding function $f_{ESC}(t)$ comprises a pseudo random bit sequence that is different for the neighboring expanded-spectrum pilot tones.

4. The optical transmitter of claim 2 wherein the pilot-tone modulator comprises a second mixer for mixing the continuous wave pilot tone and the spectrum-expanding coding function $f_{ESC}(t)$ with pilot-tone data $d(t)$.

5. The optical transmitter of claim 4 wherein the optical channel comprises a dense wavelength division multiplexed (DWDM) optical channel of a plurality of DWDM channels, and wherein the expanded-spectrum pilot tone and each neighboring expanded-spectrum pilot tone is associated with a different DWDM channel of the plurality of DWDM channels.

6. An optical receiver comprising:
an optical input configured to:
receive, from an optical channel, external to the optical receiver, in an optical network, an optical expanded-spectrum signal comprising a data signal modulated with an expanded-spectrum pilot tone, and
receive, from neighboring optical channels, external to the optical receiver, in the optical network, neighboring optical expanded-spectrum signals, each neighboring optical expanded-spectrum signal comprising a neighboring data signal modulated with one of neighboring expanded-spectrum pilot tones, the neighboring expanded-spectrum pilot tones expanded by different codes than the expanded-spectrum pilot tone;
a photodiode coupled to the optical input and configured to convert the optical expanded-spectrum signal to an analog expanded-spectrum signal;
an analog-to-digital converter (ADC) coupled to the photodiode and configured to convert the analog expanded-spectrum signal to a digital expanded-spectrum signal; and
a detector coupled to the ADC and configured to detect the expanded-spectrum pilot tone to monitor the optical channel in the optical network.

7. The optical receiver of claim 6, wherein the detector comprises a correlator configured to perform correlations to detect the expanded-spectrum pilot tone.

8. The optical receiver of claim 7, wherein the correlator is configured to perform the correlations using a pre-defined spectrum-expanding coding function that was used to modulate the expanded-spectrum pilot tone onto the data signal.

9. The optical receiver of claim 6, wherein the detector is configured to detect the neighboring expanded-spectrum pilot tones to monitor the neighboring optical channels in the optical network.

10. The optical receiver of claim 9, wherein the detector is a multi-channel detector comprising a plurality of detectors configured to detect the neighboring expanded-spectrum pilot tones.

11. The optical receiver of claim 6, wherein the optical expanded-spectrum signal is represented as follows: $E_{PT}(t)=E_o(t)(1+d(t)f_{ESC}(t)m\sin(\omega_{PT}))$ wherein m represents a modulation depth, $\omega_{PT}$ represents a pilot-tone frequency, $f_{ESC}(t)$ represents a spectrum-expanding coding function, $d(t)$ represents pilot-tone data and $E_o(t)$ represents the data signal.

12. A system comprising:
    an optical transmitter comprising an expanded-spectrum pilot-tone modulator and a digital-to-analog converter, the expanded-spectrum pilot-tone modulator configured to modulate an expanded-spectrum pilot tone onto a high-speed data signal of an optical channel to generate a digital expanded-spectrum signal, the digital-to-analog converter configured to converting the digital expanded-spectrum signal to an analog expanded-spectrum signal for transmission over an optical network; and
    an optical receiver for:
        receiving the analog expanded-spectrum signal and analog neighboring expanded-spectrum signals from the optical network,
        converting the analog expanded-spectrum signal to the digital expanded-spectrum signal and converting the analog neighboring expanded-spectrum signals to digital neighboring expanded-spectrum signals,
        detecting the expanded-spectrum pilot tone to monitor the optical channel, and
        detecting neighboring expanded-spectrum pilot tones in the digital neighboring expanded-spectrum signals, the neighboring expanded-spectrum pilot tones expanded by different codes than the expanded-spectrum pilot tone.

13. A method comprising:
    modulating an expanded-spectrum pilot tone onto a high-speed data signal to generate a digital expanded-spectrum signal;
    converting the digital expanded-spectrum signal to an analog expanded-spectrum signal;
    transmitting the analog expanded-spectrum signal over an optical channel in an optical network;
    receiving the analog expanded-spectrum signal and analog neighboring expanded-spectrum signals from the optical network;
    converting the analog expanded-spectrum signal to the digital expanded-spectrum signal and converting the analog neighboring expanded-spectrum signals to digital neighboring expanded-spectrum signals,
    detecting the expanded-spectrum pilot tone in the digital expanded-spectrum signal to monitor the optical channel in the optical network; and
    detecting neighboring expanded-spectrum pilot tones in the digital neighboring expanded-spectrum signals, the neighboring expanded-spectrum pilot tones expanded by different codes than the expanded-spectrum pilot tone.

14. A system comprising:
    an optical transmitter having an expanded-spectrum pilot-tone modulator for modulating an expanded-spectrum pilot tone onto a high-speed data signal of an optical channel to generate an expanded-spectrum signal for transmission over an optical network, the expanded-spectrum pilot-tone modulator configured to apply a spectrum-expanding coding function $f_{ESC}(t)$ to modulate the high-speed data signal, the expanded-spectrum signal represented as follows: $E_{PT}(t)=E_o(t)(1+d(t)f_{ESC}(t)m\sin(\omega_{PT}))$ wherein m represents a modulation depth, $\omega_{PT}$ represents a pilot-tone frequency, $d(t)$ represents pilot-tone data and $E_o(t)$ represents the high-speed data signal; and
    an optical receiver for:
        receiving the expanded-spectrum signal and neighboring expanded-spectrum signals from the optical network,
        detecting the expanded-spectrum pilot tone to monitor the optical channel, and
        detecting neighboring expanded-spectrum pilot tones in the neighboring expanded-spectrum signals, the neighboring expanded-spectrum pilot tones expanded by different codes than the expanded-spectrum pilot tone.

15. A method comprising:
    modulating an expanded-spectrum pilot tone onto a high-speed data signal to generate an expanded-spectrum signal, the modulating comprising applying a spectrum-expanding coding function $f_{ESC}(t)$ to modulate the high-speed data signal, the expanded-spectrum signal represented as follows: $E_{PT}(t)=E_o(t)(1+d(t)f_{ESC}(t)m\sin(\omega_{PT}))$ wherein m represents a modulation depth, $\omega_{PT}$ represents a pilot-tone frequency, $d(t)$ represents pilot-tone data and $E_o(t)$ represents the high-speed data signal;
    transmitting the expanded-spectrum signal over an optical channel in an optical network;
    receiving the expanded-spectrum signal and neighboring expanded-spectrum signals from the optical network;
    detecting the expanded-spectrum pilot tone in the expanded-spectrum signal to monitor the optical channel in the optical network; and
    detecting neighboring expanded-spectrum pilot tones in the neighboring expanded-spectrum signals, the neighboring expanded-spectrum pilot tones expanded by different codes than the expanded-spectrum pilot tone.

* * * * *

UNITED STATES PATENT AND TRADEMARK OFFICE
CERTIFICATE OF CORRECTION

PATENT NO. : 10,148,351 B2  
APPLICATION NO. : 15/074243  
DATED : December 4, 2018  
INVENTOR(S) : Jiang Page 1 of 1

It is certified that error appears in the above-identified patent and that said Letters Patent is hereby corrected as shown below:

In the Claims

Column 8, Line 66, Claim 11, delete "$E_{PT}(t) = E_0(t)(1+d(t) f_{ESC}(t)m\sin(\omega_{PT}))$" and insert --$E_{PT}(t) = E_0(t)(1+d(t) f_{ESC}(t)m\sin(\omega_{PT}t))$--.

Column 10, Lines 13-14, Claim 14, delete "$E_{PT}(t) = E_0(t)(1+d(t) f_{ESC}(t)m\sin(\omega_{PT}))$" and insert --$E_{PT}(t) = E_0(t)(1+d(t) f_{ESC}(t)m\sin(\omega_{PT}t))$--.

Column 10, Lines 35-36, Claim 15, delete "$E_{PT}(t) = E_0(t)(1+d(t) f_{ESC}(t)m\sin(\omega_{PT}))$" and insert --$E_{PT}(t) = E_0(t)(1+d(t) f_{ESC}(t)m\sin(\omega_{PT}t))$--.

Signed and Sealed this  
Twenty-sixth Day of February, 2019

Andrei Iancu  
*Director of the United States Patent and Trademark Office*